United States Patent [19]
Young et al.

[11] 3,846,771
[45] Nov. 5, 1974

[54] POSITION INDICATION SYSTEM
[75] Inventors: Frederick J. Young, Swissvale;
Francis T. Thompson, Murrysville;
Dirk J. Boomgaard, Monroeville, all of Pa.
[73] Assignee: Westinghouse Electric Corporation, Pittsburgh, Pa.
[22] Filed: Jan. 3, 1973
[21] Appl. No.: 320,776

[52] U.S. Cl............ 340/195, 340/188 R, 176/19 R
[51] Int. Cl............................................ G08c 19/06
[58] Field of Search.................................. 340/195

[56] References Cited
UNITED STATES PATENTS
3,010,063  11/1961  Rhoades............................ 340/195
3,050,943  8/1962   Thorel.............................. 340/195
3,311,905  3/1967   Johnston........................... 340/195

Primary Examiner—Thomas B. Habecker
Attorney, Agent, or Firm—D. C. Abeles

[57] ABSTRACT
A position indication system is described for detecting the relative position of a control rod within the core of a nuclear reactor. The basic sensor of this system is formed from a plurality of discrete electrical coils individually wound around the rod travel housing in a tandem array extend longitudinally along the control rod drive shaft's axis of movement. An AC current is established within each of the respective coils at a sufficiently low frequency to enable the resulting flux to penetrate the rod travel housing. A change in impedance within the individual coils is monitored as the control rod drive shaft moves past the centers of the coil locations. This change in impedance is translated to discrete electrical outputs indicative of the relative location of the control rod within the core of the nuclear reactor. In one embodiment, the respective coils are connected in series with corresponding resistors and the corresponding common node points of adjacent coil-resistor series combinations are used as inputs to a differential amplifier which provides an output representative of the voltage difference between corresponding nodes. The differential amplifier's output is then translated to a digital indication of control rod position. Alternate embodiments are presented describing a multiplicity of digital outputs which can be provided in accordance with this invention.

11 Claims, 18 Drawing Figures

POSITION INDICATION SYSTEM

CROSS REFERENCE TO RELATED APPLICATION

The present invention is related to the invention covered by copending U.S. applications: (Westinghouse Case No. 44,067), Ser. No. 320,792, entitled "Digital Multiplexed Position Indication And Transmission System" by J. A. Neuner, F. T. Thompson and L. Vercelotti; (Westinghouse Case No. 44,071), Ser. No. 320,774, entitled "An Automatic Programming System For Standardizing Multiplex Transmission Systems" by J. A. Neuner and M. Traversi; (Westinghouse Case No. 44,077), Ser. No. 320,773, entitled "Position Indication System" by J. A. Neuner and D. J. Boomgaard; (Westinghouse Case No. 44,070), Ser. No. 320,778, entitled "Tracking Level Detector" by J. A. Neuner and M. Traversi; and (Westinghouse Case No. 44,170), Ser. No. 320,775, entitled "Majority Vote System For Common-Bus Signal Distribution" by J. A. Neuner and M. Traversi. All of the aforementioned U.S. Patent applications are assigned to the assignee of the present invention and are filed concurrently herewith.

BACKGROUND OF THE INVENTION

This invention pertains in general to a new position indicator for detecting the presence of an elongated metallic member having one degree of freedom and more particularly to a position indicator that determines the relative position of controls within the core of a nuclear reactor.

There are a great number of applications requiring remote monitoring of the position of an elongated movable metallic member having one degree of freedom along its longitudinal axis. For example, in the nuclear art it is necessary to raise and lower control rods within the reactor core for controlling the energy output of the nuclear reactor. The use of the term "Control Rods" is used herein to include any member positioned within the reactor which alters the reactivity of the reactor. Thus, this includes rods which serve other purposes besides normal control use. The use of the word "rod" is synonymous with "control rod" for the purposes of this invention.

The control rods are located within proximity of nuclear fuel elements comprising nuclear fissionable material. Generally, the greater the number of neutrons within the reactive region of the reactor, the greater the number of fissions of the fuel atoms that take place, and consequently, the greater the amount of energy released. Energy, in the form of heat, is removed from the reactive region by a coolant which flows through the region and then flows to a heat exchanger wherein the heat from the reactor coolant is used to generate steam for driving turbines to transform heat energy into electrical energy. To decrease the energy output of the nuclear reactor, the control rods, made of materials which absorb neutrons, are inserted within the reactive region, commonly known as the nuclear core. The greater the number of control rods and the further the control rods are inserted within the reactive region, the greater the number of neutrons that will be absorbed and hence the energy output of the reactor will decrease. Conversely, to increase the energy output of the reactor, the nuclear control rods are withdrawn from the reactive region. Consequently, the number of neutrons absorbed decreases, the number of fissions increase, and the energy output of the reactor increases.

For pressurized water reactors, it is of the utmost importance to know the accurate position of each of the control rods. Differences of over 15 inches between neighboring rods are considered unsafe. In addition, knowledge of the position of the rods versus thermal power output gives an inication of the condition of the reactor, thus, the degree of fuel burnup. Therefore, extremely reliable control rod drive and position monitoring systems must be employed in order to maintain the safe and reliable operating status of the reactor.

One system presently employed to lower and raise the control rods utilizes a jack-type electromechanical mechanism which employs a plurality of electrical coils to incrementally insert or withdraw each control rod within the reactor. Such a system is more fully described in U.S. Pat. No. 3,158,766 issued to E. Frisch and assigned to the assignee of the present invention.

As previously described, the control rods move within a pressure vessel and are attached to drive rods, which can be incrementally moved in a forward or reverse direction by a drive mechanism, such as the magnetic jack mechanism described in the cited Frisch patent. The drive rod extends longitudinally through the pressure vessel, along the axis of movement of the control rod, into the sealed, pressurized environment of the rod travel housing. Since it is of the utmost importance to maintain the sealed integrity of the pressurized vessel, mechanical penetrations are kept at a minimum to reduce the likelihood of loss of the pressurized environment contained therein. Accordingly, no mechanical penetrations are permitted for detecting the relative position of the control rods within the core of the reactor. Inasmuch as it would be a very difficult task to detect the position of the actual control rods, it has been the practice to detect the position of the drive rods which are affixedly coupled thereto and translate drive rod position into control rod location within the core of the reactor vessel.

There have been a multiplicity of systems devised for detecting the drive rod position, a few examples of which are illustrated in application Ser. No. 093,343, entitled "Magnetic Position Indicator," by Dean C. Santis, et al, filed Nov. 27, 1970 and assigned to the assignee of the present invention. Each of the indicators described have some dependence on temperature, rod magnetization, permeability of the rod, voltage and frequency of the power supply. Additionally, each of the described systems are susceptible to interferences from adjacent control rods and drive mechanisms.

Thus, a new rod position indicator is desired to detect the position of the drive rod within a specified accuracy, while maintaining a high degree of insensitivity to the aforementioned conditions.

SUMMARY OF THE INVENTION

Briefly, this invention provides a position indication system for detecting the location of an elongated longitudinally movable metallic member having 1° of freedom along an axis corresponding with its longitudinal dimension. The systems' position sensor is basically formed from a plurality of discrete electrical coils individually wound around the circumferential periphery of the axis of movement of the movable member, extending in a tandem array longitudinally therealong. An AC current is established within each of the respective coils and the impedance change induced by the variation in the magnetic field generated by the respective coils as the movable member passes through the corresponding coil centers is monitored and translated to discrete outputs indicative of the movable members' position relative to the individual coil locations.

In nuclear reactor applications, where the system is employed as a control rod position indicator, the discrete outputs obtained in accordance with this invention provide improved accuracy over a range of plant operating conditions extending from cold shutdown to full power. The sensor system, thus provided, is insensitive to plant operating temperatures; requires no calibration, and maintains a level of stability that has been aspired to but not achieved by the position indicators of the prior art. Furthermore, the digital sensing techniques described, generated from the discrete outputs, enhance the noise immunity and reliability of the entire sensing system.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Accurate knowledge of the position of the control rods in a nuclear reactor is essential for insuring the reactors safe and efficient operation. As can be appreciated by referring to FIG. 1, the sensing of the position of the control rods within a pressurized water reactor is particularly difficult because of necessity for maintaining the sealed integrity of the reactor pressure vessel 41. The control rods 72 and the drive rods 74, which are structurally coupled to their respective control rods 72, are surrounded with water 40 which completely fills the pressure vessel 41. Under normal operating conditions, the water is at a high temperature and is pressurized so that no boiling takes place.

Figure 1:
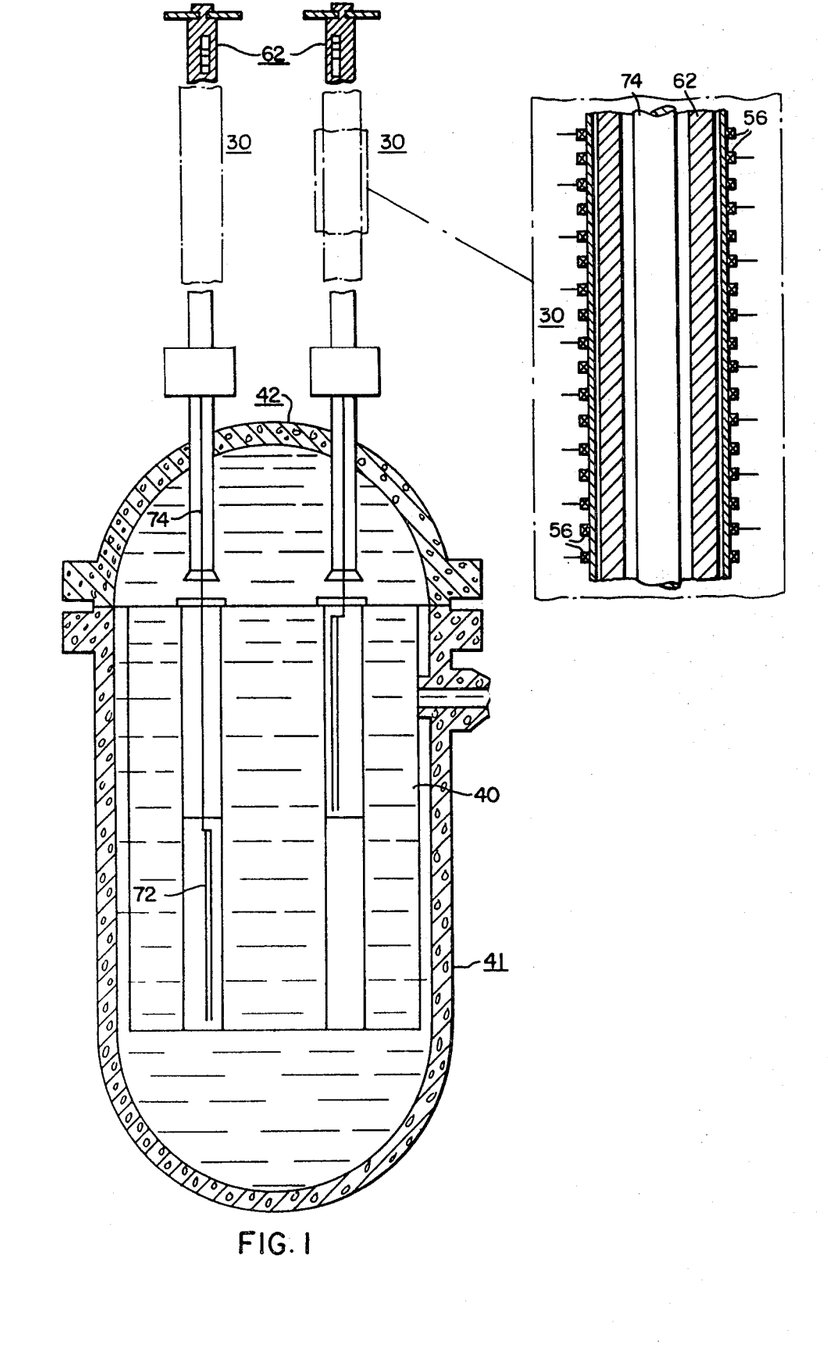
FIG. 1 is a schematic diagram of a nuclear reactor and its control rod drive, embodying the novel position indicator of this invention.

The position of the control rods 72 must be determined from measurements of the state of sensing elements placed outside the pressure vessel 41, because no mechanical penetrations of the pressure vessel 41 for purposes of control rod position sensing are permitted. The only area where sensing elements can be placed is along the rod travel housing 62. The drive rods 74 move within their respective rod travel housings 62, which are selaed pipes which are formed integral with and extend longitudinally upward from the head 42 of the reactor.

Sensing elements 56 placed along the rod travel housing 62 can sense the position of the drive rod 74 only. However, it is normally assumed that the fastening of the control rod 72 to its respective drive rod 74 is reliable and therefore the displacement of the drive rod 74 and the control rod 72 are the same. Compensation for thermal expansion can be made, where desired, by the application of compensation techniques well within the state of the art. For a more detailed understanding of the reactor control rod system, reference may be had to application Ser. No. 721,122, filed Apr. 12, 1968 by Robert J. Creagan et al, entitled "Fuel Assembly For A Nucear Reactor," and assigned to the Westinghouse Electric Corporation.

In accordance with this invention, a new rod position indication system has been developed for detecting the presence or absence of the control drive rods at the respective indicator locations. Logic is implemented with high noise immunity, and the system described is specifically amenable to the use of high threshold logic, "HTL," employing new low power drain complementary-symmetry metal-oxide-semiconductor "COS/MOS" integrated circuits.

Up until the development of the digital system, contemplated by this invention, rod position indication systems of the prior art utilized analog techniques for both sensing and signal processing. The transducer was basically a linear transformer, designed in various configurations, with the control drive shaft serving as the armature. The adverse geometry and environmental conditions associated with the sensing element required close attention to details during design, manufacture and field calibration. The development of the digital sensing system, contemplated by this invention, reflected the desire to overcome these difficulties while at the same time improving performance, assuring reliability and availability and minimizing installation and startup costs.

Figure 2A:
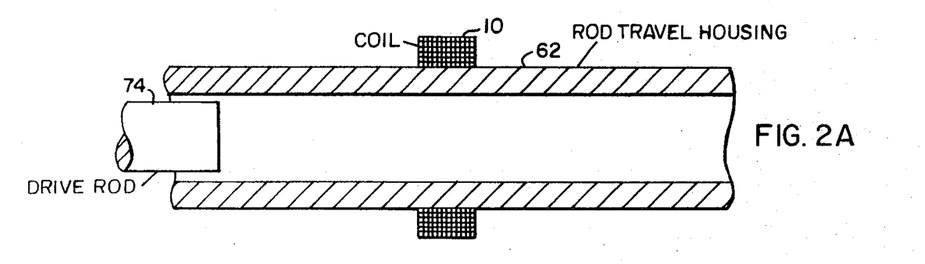
FIG. 2A is a schematic diagram of a control drive rod and its rod travel housing incorporating one coil of the basic sensor of this invention.
Figure 2B:
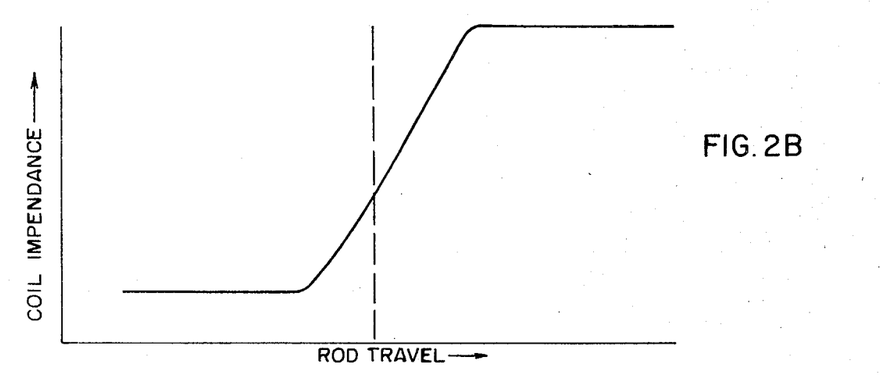
FIG. 2B is a graphical illustration of the coil impedance of FIG. 2A versus rod travel.

A single element 10, which forms the basic building block of the array of elements 30 comprising the basic sensor of this invention, illustrated in FIG. 1, is shown in FIG. 2A. The single element 10 is formed from an electrical coil which is wound around the rod travel housing 62. An AC current of a sufficiently low frequency is established within the individual coils so that the resulting AC flux will penetrate the rod travel housing, which is usually constructed of non-magnetic stainless steel. With a sufficiently low frequency, the skin depth of the resulting magnetic flux will be larger than the thickness of the rod travel housing 62, and the AC flux will penetrate all the way through to the interior thereof. The normal power frequency of 60 Hz easily meets this criterion. If then a metal rod is moved through the rod travel housing and passes through the center of the coil location, the impedance of the coil will change. If the rod is constructed from a ferromagnetic material, the impedance of the coil will increase. The reactor drive rod is normally constructed from a ferromagnetic material, such as magnetic stainless steel, so that when the drive rod travels along its axis of movement through the center of the coil location an increase in impedance within the coil can be detected as graphically illustrated in FIG. 2B. The change in impedance can be measured either by monitoring the current through the coil 10, if the coil is driven from a constant voltage source, or by monitoring the voltage across the coil, if the coil is driven from a constant current source.

In order to measure the rod position along its full course of travel, this invention provides a tandem array of such coils stacked longitudinally along the rod travel housing as generally illustrated by reference character 30 in FIG. 1.

Figure 3A:
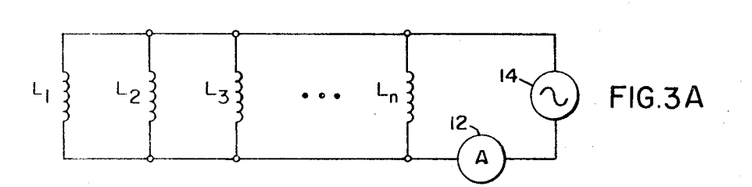
FIG. 3A is a schematic circuitry diagram illustrating one exemplary arrangement for monitoring the impedance of the respective coils of the position sensor of this invention.
Figure 3B:
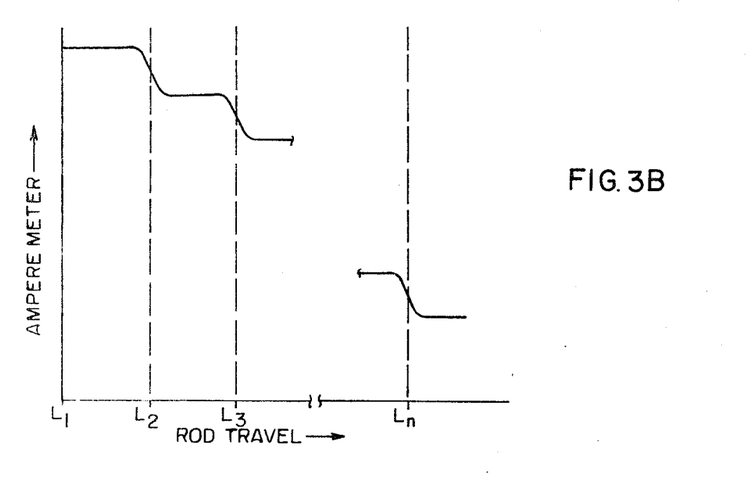
FIG. 3B is a graphical illustration of the coil impedance of FIG. 3A versus rod travel.

In one exemplary embodiment, as illustrated in FIG. 3A, the coils are connected in parallel to a constant voltage source, and the current through the stack of coils is monitored. Referring to FIG. 3A, it can be seen that the individual coils are labeled $L_1, L_2, L_3, \ldots L_n$, with the voltage source and ammeter being respectively identified by reference characters 14 and 12. Everytime the rod moves through an additional coil as it proceeds along its axis of movement, the current meter 12 will drop another step as graphically illustrated in FIG. 3B. Of course, instead of reading the current one can also read the voltage across a small resistor in series with the stack of coils. Although, position indication is provided in discrete steps as the rod moves past the individual coils, the system will be temperature sensitive and also sensitive to fluctuations in the power source 14. The following embodiments, which present the information desired in digital form overcome this relative sensitivity of the system, which is of particular importance within adverse operating environments such as are found in reactor systems.

Figure 4A:
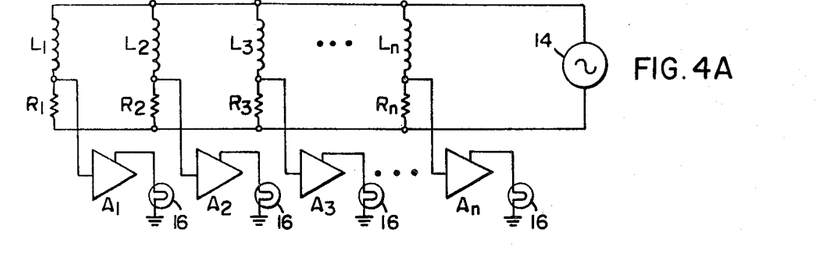
FIG. 4A is a schematic circuitry diagram illustrating a second exemplary arrangement for monitoring the impedance values of the sensor of this invention.
Figure 4B:
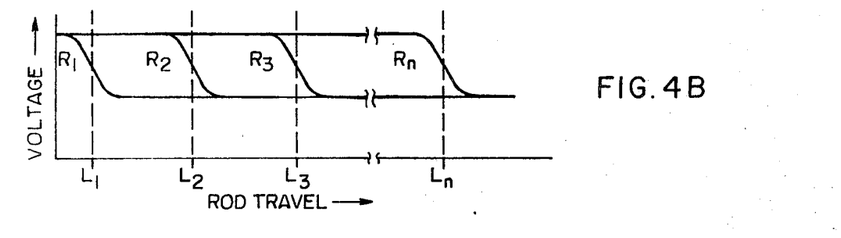
FIG. 4B is a graphical illustration of the voltage across the resistors of FIG. 4A versus rod travel.
Figure 4C:
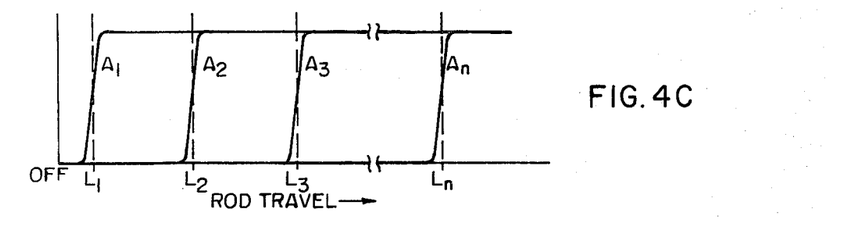
FIG. 4C is a graphical illustration of the output of the amplifiers of FIG. 4A versus rod travel.
Figure 4D:
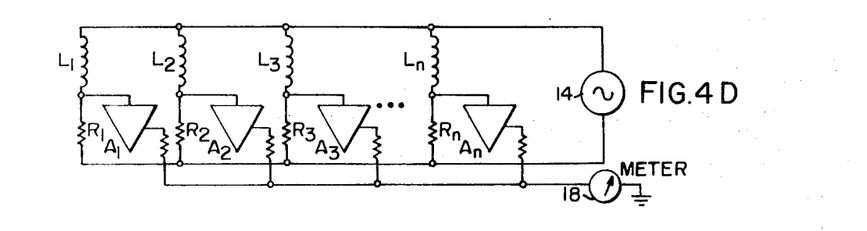
FIG. 4D is a schematic circuitry diagram of a modification to the circuit of FIG. 4A.
Figure 4E:
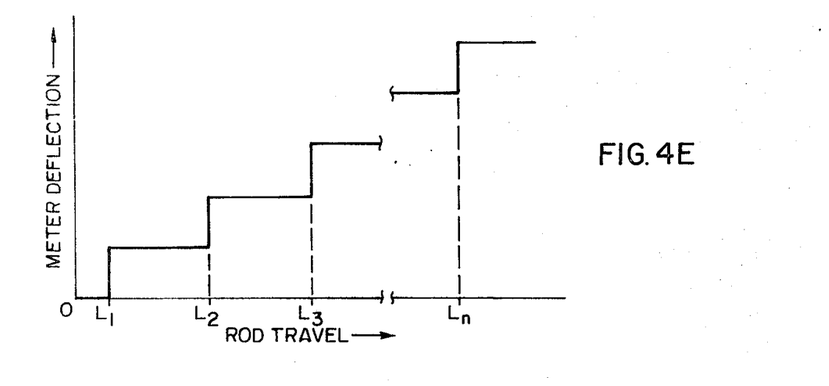
FIG. 4E is a graphical illustration of the output of the circuit of FIG. 4D versus rod travel.

In the modification to the output processing circuitry illustrated in FIG. 4A, the individual coils are connected in series with a corresponding small resistor respectively labeled $R_1, R_2, R_3, \ldots R_n$, the respective resistors correspond to the individual coils $L_1, L_2, L_3, \ldots L_n$. The individual coil-resistor series combinations are then connected in parallel to a constant voltage source 14. The voltage at each tie point of a coil-resistor combination will then follow the curve provided in FIG. 4B. By electronic means, generically described by reference letters $A_1 \ldots A_n$, this can easily be transformed to an on/off situation as shown in FIG. 4C. Therefore, if a string of lights 16 are connected as illustrated in FIG. 4A, it can easily be observed where the actual location of the control rod is with respect to the individual coils. A slight modification to the circuit can be provided by connecting the outputs to a summing circuit and displaying the results on a panel meter 18 as schematically illustrated in FIG. 4D and graphically shown in FIG. 4E.

Figure 5A:
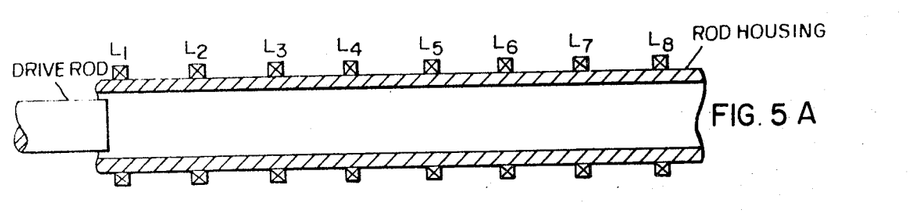
FIG. 5A is a schematic diagram of a control drive rod and its rod travel housing incorporating a plurality of the coils of the sensor of this invention.
Figure 5B:
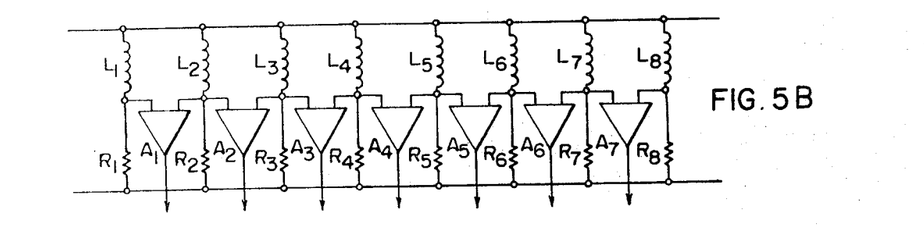
FIG. 5B is a schematic circuitry diagram of an alternate arrangement of electrical components to provide discrete outputs for the sensor of this invention.
Figure 5C:
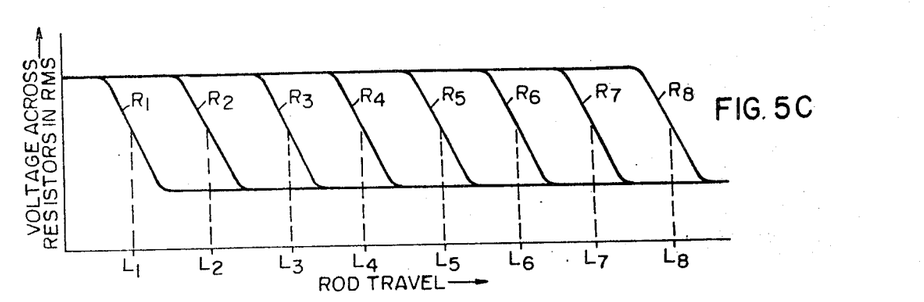
FIG. 5C is a graphical illustration of the voltage across the resistors of FIG. 5B versus rod travel.
Figure 5D:
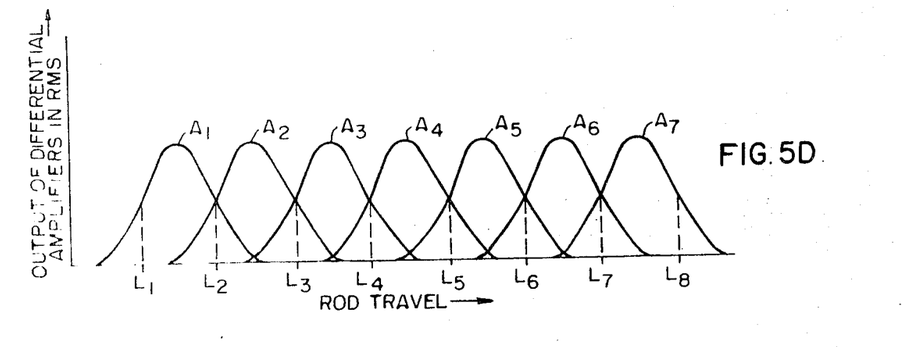
FIG. 5D is a graphical illustration of the output of the differential amplifiers illustrated in FIG. 5B versus rod travel.

Additional benefits can be obtained by modifying the output electronics as illustrated in FIG. 5B. For convenience, a schematic diagram of the control drive rod, previously illustrated with reference to FIG. 2A is again presented in FIG. 5A, including the tandem arrangement of discrete coils $L_1 \ldots L_8$ corresponding to the schematic circuitry illustration of coils $L_1 \ldots L_8$ shown in FIG. 5B. Of course, any number of coils can be used in the tandem arrangement, normally an assembly of approximately 42 discrete coils is employed. As illustrated in FIG. 5B, each coil is connected to a corresponding resistor $R_1 \ldots R_8$, and the corresponding inputs of the respective differential amplifiers $A_1 \ldots A_8$ are connected between each corresponding pair of adjacent resistors. The voltage across each of the corresponding resistors is respectively illustrated in FIG. 5C and the differential voltage between each adjacent pair of resistors (and thus the output of the differential amplifiers) is respectively illustrated in FIG. 5D. Thus, it can be seen that there is always one differential output larger than all the others as the rod travels along its course of movement indicating exactly between which two coils the end of the rod is positioned, This again can be transformed by electronic means to an on/off condition, such as by connecting a string of lights, as previously described with reference to FIG. 4A.

The coils are spaced along the rod travel housing relatively close together. Therefore, it is virtually impossible to build up an appreciable gradient in temperature, magnetic field, material constants, etc. between two adjacent coils. Since the whole system operates on the principle of balance or unbalance between two adjacent sensors, it appears that only the rod can cause this condition, by being through one sensor and not through the adjacent one. Accordingly, this system is insensitive to temperature, adjacent rods, variations in power supply (voltage and frequency), magnetization of the rod, and magnetic properties of the rod.

Of course, care has to be taken that the coils in themselves are equal to each other, and that the same is true for the terminating resistors. Since the coils to have a certain amount of mutual coupling, the coils positioned at each end of the tandem array behave slightly differently than the inside coils. Small corrections to the terminating resistors for the two end coils will minimize this affect.

Figure 6A:
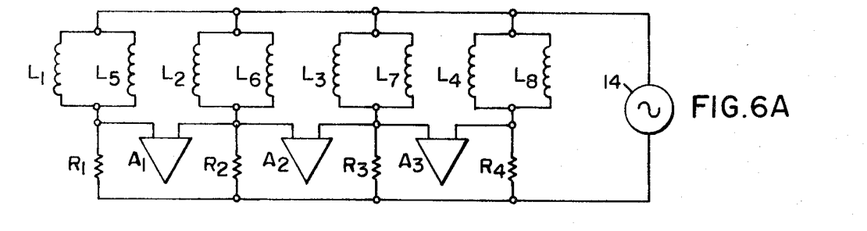
FIG. 6A is a schematic circuitry diagram of a modification to the circuit of FIG. 5B.
Figure 6B:
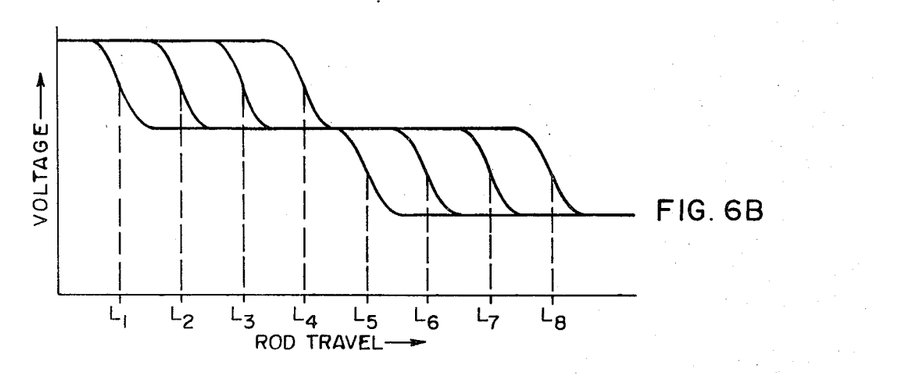
FIG. 6B is a graphical illustration of the voltage across the resistors of FIG. 6A versus rod travel.
Figure 6C:
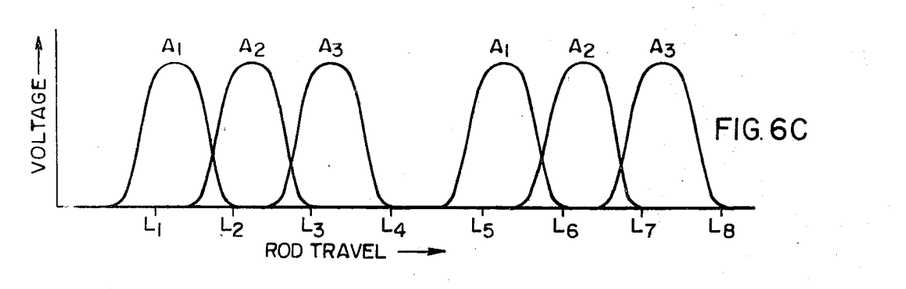
FIG. 6C is a graphical illustration of the voltage output of the differential amplifiers of FIG. 6A versus rod travel.

To save on wiring and equipment, combinations of coils and resistors can be made, such as that provided in FIG. 6A, where only eight coils are shown for the sake of simplicity. The voltage on the corresponding resistors are respectively illustrated in FIG. 6B and the differential voltage is respectively illustrated in FIG. 6C. This system provides the same information as the system described in conjunction with FIG. 5B. However, there is one more piece of information necessary to determine in which half of the travel the rod is. This piece of information can be furnished by a level detector inserted in the circuit of resistor $R_4$ which will indicate when the control rod has passed through coil $L_3$ and has entered coil $L_4$. The output can now be considered a coded one, and can be displayed as such or further processed. Thus, in this way, the number of wires and differential amplifiers can be reduced by a factor of two. This reduction can be carried on three or four times, depending upon the signal to noise ratio desired.

Figure 7:
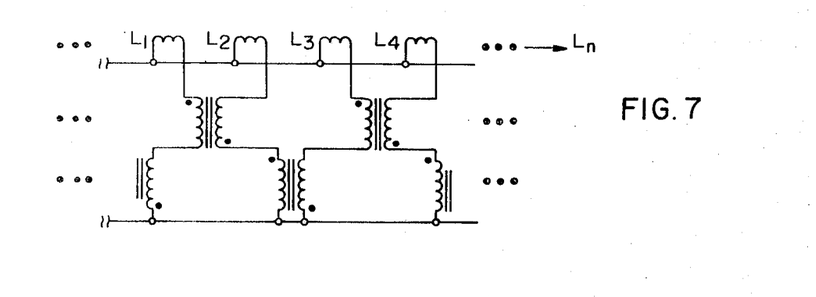
FIG. 7 is a schematic circuitry diagram of a second modification to the circuit of FIG. 5B.

Some of the functions previously mentioned can be performed by a system using differential transformers in place of amplifiers. An example of such a circuit, which is a modification to the circuit of FIG. 5B, is illustrated in FIG. 7. Each coil is connected to the primary of a differential transformer as shown. The outputs of the differential transformers (obtained from their secondaries, not shown in the Figure) are sent to the processing electronics. The operation of the system is identical with that described for the circuit of FIG. 5B.

While all of the aforementioned embodiments have been described in conjunction with simplified readouts, particular advantage can be obtained by using the apparatus of this invention in conjunction with the interfaces, alarm systems, and readout systems described in applications: (Westinghouse Case 44,067) Ser. No. 320,792, by J. A. Neuner, F. T. Thompson and L. Vercellotti, entitled "Digital Multiplexed Position Indication And Transmission System;" (Westinghouse Case No. 44,071) Ser. No. 320,774, entitled "An Automatic Programming System For Standardizing Multiplex Transmission Systems," by J. A. Neuner and M. Traversi; (Westinghouse Case No. 44,077) Ser. No. 320,773, entitled "Position Indication System" by J. A. Neuner and D. J. Boomgaard; (Westinghouse Case No. 44,070) Ser. No. 320,778, entitled "Tracking Level Detector," by J. A. Neuner and M. Traversi; and (Westinghouse Case No. 44,170) Ser. No. 320,775, entitled "Majority Vote System For Common-Bus Signal Distribution" by J. A. Neuner and M. Traversi. All of the aforementioned inventions being filed concurrently herewith and assigned to assignee of the present invention.

Within commercial nuclear power plants there is a strong need for a stable, accurate, reliable, rod position indication system. The system described and contemplated by this invention displays to the operator of the nuclear plant the absolute position of the rods controlling the thermal power output of the reactor. The rod position indication system also alerts the operator to dropped rods by controlling certain annunciators and supplies information to the reactor plant computer for a determination of rod deviation as described in the aforementioned copending applications.

The new rod position indication system, composed of two distinct parts (the detectors described in accordance with this invention and the electronics as described in the cited copending applications), is a simple, digital, solid state system. It requires no adjustments since it does not need periodic calibration and is insensitive to rod magnetization and ambient temperature variations. In addition, this system is amenable to a new feature, in that failures (such as an open coils) are detected; and the system, on an individual rod basis, will automatically resort to a one-half accuracy mode instead of being lost completely, as described in the cited copending applications. Field wiring, reactor containment penetrations and peripheral equipment are reduced by the application of simplified multiplexing techniques. The rod position display is also improved by utilizing a column of light emitting diodes, for each mechanism, to graphically display the position of the individual control rods.

We claim:

1. A position indication system for detecting the location of an elongated, longitudinally movable, metallic member having one degree of freedom along an axis corresponding to its longitudinal dimension comprising:

a plurality of discrete electrical coils wound around the circumferential periphery of the axis of movement of the movable member and arranged in tandem longitudinally therealong;

an alternating current source electrically coupled to each of said plurality of coils; and means for respectively detecting a change in impedance within each of said plurality of coils as the movable member moves along its axis of movement, said detection means providing discrete outputs indicative of the location of the movable member relative to said tandem arrangement of discrete coils.

2. The position indication system of claim 1 wherein the movable member has an elongated dimension approximately equal to the longitudinal dimension of said tandem arrangement of discrete coils and the movable member appears substantially within the center of each of said plurality of discrete coils, concurrently, at at least one point in travel thereof.

3. The position indication system of claim 1 wherein said plurality of coils are connected in parallel to said alternating current source which is arranged to have a substantially constant voltage output and said means for measuring the respective impedance change within said plurality of coils comprises means for measuring the current therethrough.

4. The position indication system of claim 1 wherein said means for detecting an impedance change within said plurality of discrete coils is responsive thereto to provide a digital output indicative of the location of the movable member relative to said tandem arrangement of coils.

5. The position indication system of claim 4 wherein each of said plurality of coils is connected in series with a corresponding resistor and each of said respective coil-resistor series combinations is connected in parallel to said alternating current source and wherein said means for detecting an impedance change monitors circuit parameters at the respective tie points of the corresponding coil-resistor combinations.

6. The position indication system of claim 5 wherein said means for detecting an impedance change comprises a plurality of differential circuit means having separate inputs respectively connected between the tie points of corresponding coil-resistor series combinations lying adjacent along the tandem array of said plurality of coils, said differential circuit means being responsive to the voltage differential appearing across the separate inputs to provide an output indicative thereof, the respective outputs of said plurality of differential circuit means are connected to corresponding readout means responsive to the differential output to provide an indication of the relative position of the movable member with respect to said coil locations.

7. The position indication system of claim 6 wherein said differential circuit means comprises differential amplifiers.

8. The position indication system of claim 6 wherein said differential circuit means comprises differential transformers.

9. The position indication system of claim 5 wherein at least two of said plurality of coils lying adjacent along the tandem array are connected in parallel and said parallel coil combination is connected to said corresponding series resistor to form said coil-resistor series combination.

10. The position indication system of claim 1 wherein said movable member is a reactor drive rod forming part of a nuclear reactor control rod assembly.

11. The position indication of claim 1 wherein said metallic member is constructed from ferromagnetic material.

* * * * *